(12) United States Patent
Frees et al.

(10) Patent No.: US 6,188,191 B1
(45) Date of Patent: Feb. 13, 2001

(54) SERVO SYSTEM RESPONSIVE TO TEMPERATURE CHANGES

(75) Inventors: Gregory Michael Frees, Los Altos; Louis Joseph Serrano, San Jose, both of CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/303,912

(22) Filed: May 3, 1999

(51) Int. Cl.[7] .............................. G05B 5/01; G05B 5/596
(52) U.S. Cl. ..................... 318/560; 318/561; 318/611; 360/75; 360/78.04; 360/78.05; 369/44.25; 369/44.29
(58) Field of Search ..................... 318/560–696; 360/72–79; 369/44.29, 44.28, 44.35; 73/504.12, 504.13; 702/147

(56) References Cited

U.S. PATENT DOCUMENTS

| | | |
|---|---|---|
| 4,207,601 * | 6/1980 | Desai et al. ............................ 360/78 |
| 4,945,311 * | 7/1990 | Smith ................................... 328/167 |
| 5,018,858 * | 5/1991 | Malvern ................................ 356/350 |
| 5,032,776 | 7/1991 | Garagnon . |
| 5,128,813 * | 7/1992 | Lee .................................... 360/78.07 |
| 5,155,422 | 10/1992 | Sidman et al. . |
| 5,325,247 | 6/1994 | Ehrlich et al. . |
| 5,369,345 * | 11/1994 | Phan et al. ........................... 318/561 |
| 5,444,583 | 8/1995 | Ehrlich et al. . |
| 5,510,939 | 4/1996 | Lewis . |
| 5,557,550 * | 9/1996 | Vigil et al. ........................... 364/557 |
| 5,594,603 * | 1/1997 | Mori et al. ........................... 360/78.04 |
| 5,721,648 | 2/1998 | Phan et al. . |
| 5,768,228 * | 6/1998 | Bates et al. ........................ 369/44.28 |
| 5,875,162 * | 2/1999 | Baba ................................. 369/44.35 |
| 5,978,163 * | 11/1999 | Cunningham ........................ 360/66 |
| 6,014,285 * | 1/2000 | Okamura ........................... 360/78.04 |

OTHER PUBLICATIONS

IBM Technical Disclosure Bulletin, vol. 32, No. 8B, Jan. 1990, pp. 346–347, "Automated Custom Tuning Servo System for Hard File Manufacturing".

* cited by examiner

Primary Examiner—Paul Ip
(74) Attorney, Agent, or Firm—Ohlandt, Greeley, Ruggiero & Perle, L.L.P.

(57) ABSTRACT

A disk drive system includes a servo system for driving mechanical parts, including a read/write head, to a desired track on a disk. The mechanical parts undesirably resonate at a frequency f, where f is a function of a temperature t of those mechanical parts. The servo system includes a notch filter responsive to an indication of temperature t, to attenuate the amplitude of frequency f in a broadband control signal that is applied to move the mechanical parts.

21 Claims, 3 Drawing Sheets

SERVO SYSTEM RESPONSIVE TO TEMPERATURE CHANGES

FIELD OF THE INVENTION

This invention relates to a servo system producing a signal for positioning one member having a resonant frequency f which varies with temperature, relative to another member and, more particularly to such a system which includes means for controlling responsiveness of the one member to temperature changes.

BACKGROUND OF THE INVENTION

A computer disk drive typically employs a servo system containing means to position a read/write head relative to a data-containing disk. The disk has data arranged in tracks which also contain a track following signal. When it is desired to move the read/write head to a new track, a broadband signal is applied to the positioning means to drive the read/write head to the desired track.

As the read/write head nears the desired track, a reverse polarity signal is applied to the positioning means, causing it to act like a brake and ideally stopping the read/write head over the desired track, centered over the track following signal. During this process, considerable but variable heat is generated. Furthermore the mechanical structure of the positioning means has a natural resonance at a frequency f, the value of which is a function of temperature. Thus frequency f may range from a low of f1 to a high of f2.

The prior art solution to the problem involved attenuating the broadband signal over the entire range of possible resonant frequencies, i.e., the creation of a notch in the frequency spectrum of the broadband signal. Any such attenuation also affects the broadband signal at frequencies away from the notch, and results in a less than ideal behavior. By widening the notch to account for the changes in frequency of the resonant mode due to temperature, this effect is increased. Further, as the depth of the notch is not constant with frequency (that is, every notch is more effective at some frequencies than others), the behavior of the system can change as temperature changes move the frequency of the resonant mode.

In summary, the problems with the prior art solution are (1) the notch needs to be wide to account for the change in frequency of the resonant mode with temperature, and (2) the behavior of the system can change as temperature changes move the frequency of the resonant mode.

Accordingly, it is an object of this invention to provide an improved method and apparatus for control of a read/write head positioning means under conditions of varying temperature.

SUMMARY OF THE INVENTION

A servo system for operating in a region of ambient temperature includes a first member, and a second member positionable relative to the first member. The system further includes a control loop producing a broadband frequency signal coupled to the second member for causing the second member to be positioned to a desired location relative to the first member. The second member has a natural resonant frequency f, which is a function of the ambient temperature.

The servo system provides a signal indicative of the temperature and the control loop includes means responsive to the temperature signal to attenuate the broadband frequency signal at frequency f.

DESCRIPTION OF THE PREFERRED EMBODIMENT

Figure 1:
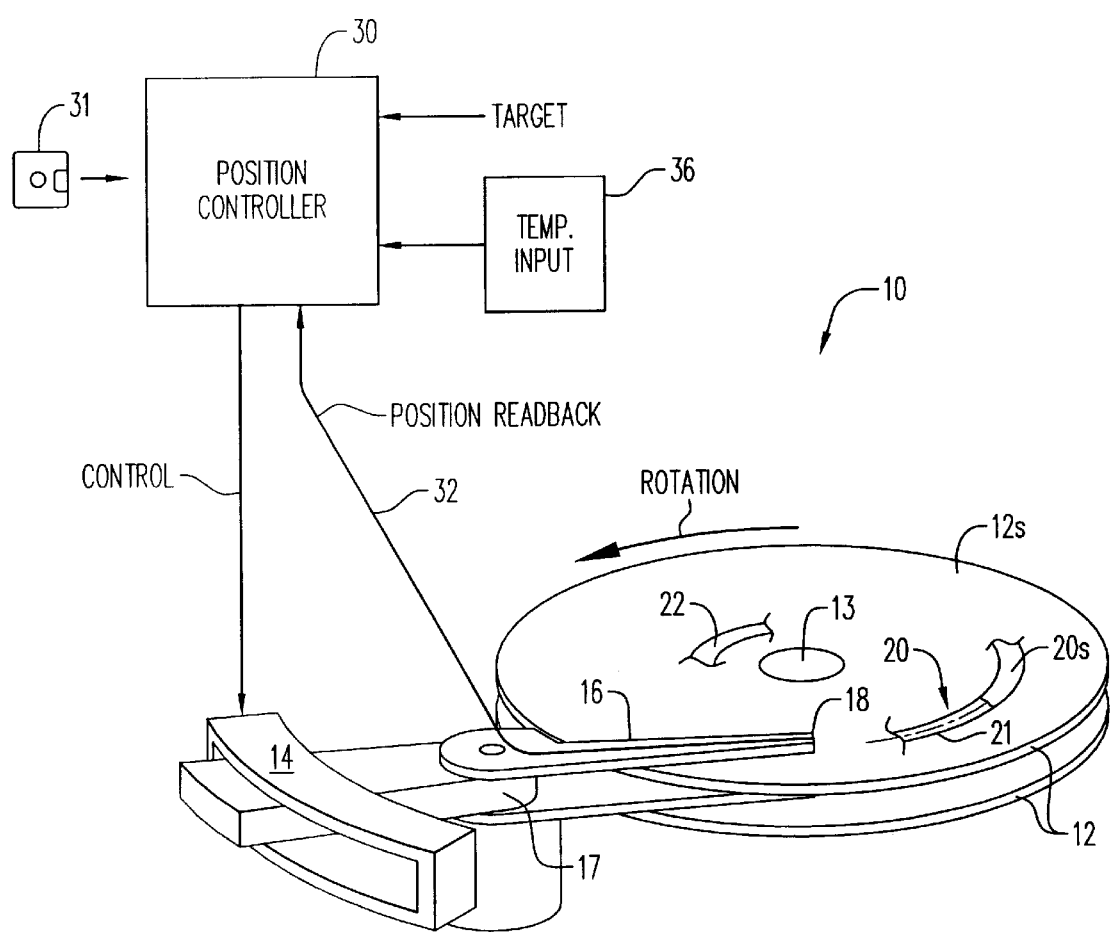
FIG. 1 illustrates a computer disk drive with servo system in schematic and block design that incorporates the invention.

Referring to FIG. 1 a computer disk drive storage device 10 is illustrated. System 10 includes a plurality of data-containing disks, two of which (i.e., disks 12) are rotated by a motor-driven spindle 13). A positioning motor 14 (which is typically a voice coil motor) is coupled to an arm 16 for each disk and each arm 16 supports read/write head 18. Arms 16 are separated by spacer 17 corresponding to the spacing of disks 12.

A disk 12 has, on a surface 12s, a plurality of data tracks, such as track 20 that are capable of having a data portion 19 written or read by read/write head 18. The data tracks also have embedded therein a servo position readback signal, such as 20s. A "target" signal from a source (not shown) that is indicative of a desired track, e.g., 20, to which read/write head 18 is to be positioned, is coupled as an input to a position controller 30.

Position controller 30 produces an output control current which is applied to positioning motor 14, causing arm 16 and thus read/write head 18 to be moved from a current position, e.g., over track 20, to a desired track, e.g., track 22. Read/write head 18 reads the position readback signal for the desired track and passes that signal to position controller 30 via line 32.

Theoretically the operation of the system should occur as follows. It will initially be assumed that read/write head 18 is positioned over track 20 and that disks 12 are rotating. A target signal representing a desired track, for example track 22, is sent to position controller 30. Position controller 30 applies a first polarity broadband frequency control current to motor 14, causing read/write head 18 to start moving from a position over track 20 toward a position over track 22. As read/write head 18 approaches track 22 an opposite polarity control current, is applied to motor 14 to slow and ultimately stop read/write head 18 directly centered over track 22. The positioning of read/write head 18 is indicated by the position readback signal from read/write head 18 to position controller 30.

In practice the operation of the system of FIG. 1 not as ideal as described above. Rather, considerable heat is generated by motor 14, the spinning disks, the electronics, etc. and the heat varies depending on a number of factors, one of which is the distance between the initial track and desired track. The disk drive is enclosed in a housing (not shown) so the heat cannot rapidly dissipate. Further arm 16 and read/write head 18 exhibit a natural frequency f, the value of which depends on the temperature. As a result read/write head 18 does not typically stop directly centered over the desired track, but rather oscillates back and forth (first toward one track edge then toward the other track edge) around the center line.

The prior art solution is to include in position controller 30 a notch filter which "notches" out that portion of the control current signal related to some frequency f as related to an average value of temperature. The notch is wider than necessary to account for changes in the value of f with changes in temperature.

Applicants have improved upon the prior art solution by including a temperature input 36 that inputs to position controller 30 a signal corresponding of the actual temperature of the disk drive components. That signal alters the notch filter frequency to match the natural resonant frequency f corresponding to the particular temperature of device 10. The notch filter is thereby controlled to eliminate the natural resonant frequency f (and a very narrow band of surrounding frequencies). The result is that tracking by read/write head 18 over a desired track is greatly improved.

Figure 2:
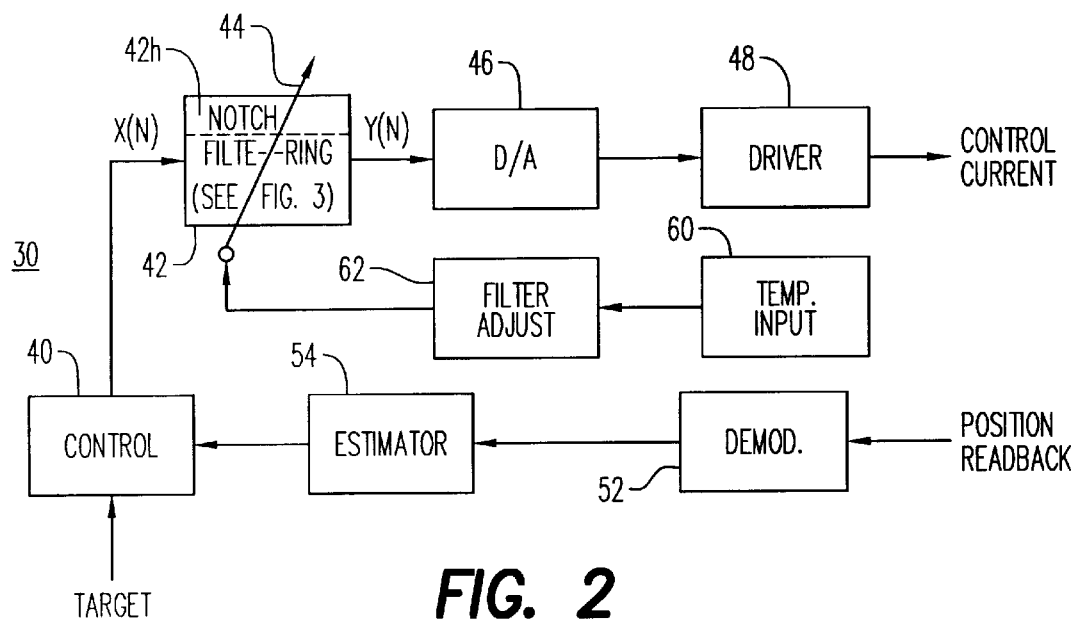
FIG. 2 illustrates in greater detail the Position Controller of FIG. 1.

Turning now to FIG. 2 position controller 30 is shown in greater detail. FIG. 2 is of conventional design (with the exception of temperature input and filter adjust blocks 60 and 62). Accordingly, only an overview of position controller 30 will be given.

A target signal representing the position of a desired track, or representing a difference between the track over which read/write head 18 is currently positioned and a desired track, is input to a control block 40. The purpose of control block 40 is to provide a broadband signal that will move read/write head 18 to a desired track position in accord with a difference between the target position and an estimated current position.

The broadband control signal output of control block 40 is fed to a filter circuit 42 (which is preferably a digital filter but can be an analog filter). Filtering of various frequencies that are input to filter circuit 42 occurs as is known to those familiar with servo system design. Filter circuit 42 also includes a notch filter 42n, to be described in more detail in connection with FIG. 3. One exemplary type of notch filter 42n is a two pole Butterworth filter. Arrow 44 schematically illustrates that the notch frequency, can be varied, i.e., that is, that the frequency within the broadband signal which is greatly attenuated by notch filter 42n, can be varied.

Presently, however, assume that notch filter 42n is preset to filter out the natural resonant frequency of the combination of arm 16 and read/write head 18, over a range of f1 to f2. The output of notch filter 42n is coupled to a digital-to-analog converter (D/A) 46. The output of D/A converter 46 provides a relatively low voltage and current that is coupled to driver 48 which produces an analog control current signal of a relatively high current, e.g., perhaps 2 amps. The output of driver 48 is coupled to motor 14 (FIG. 1) to move read/write head 18 to the track specified by the target signal.

The position readback signal, which is analog, is coupled to a demodulator (demod) 52 which converts the position readback signal into a digital signal that is passed to estimator 54. Estimator 54 provides an output signal that corresponds to an estimate of a current position of read/write head 18 over the respective track through analysis of the readback signal (e.g., by analysis of the amplitude of the readback signal). The current position output of estimator 54 is coupled to control block 40.

In accordance with the invention, a temperature input device 60 measures the temperature of the combination of the drive motor 14, arm 16 and read/write head 18. In practice drive 10 contains a circuit board (not shown) and temperature input device 60 is mounted thereon. The measurement can be a direct measurement of temperature or an indirect measurement, such as a measure of the input current to motor 14 as a function of time and relating that in a known way to temperature.

The output of temperature input device 60 is coupled to a filter adjust circuit 62, the output of which is coupled to notch filter 42. Filter adjust circuit 62 is responsive to temperature signals to attenuate a frequency f (and a very narrow band of surrounding frequencies) within the broadband output signal from control block 40. Frequency f is a function of temperature measured by temperature input device 60.

Figure 3:
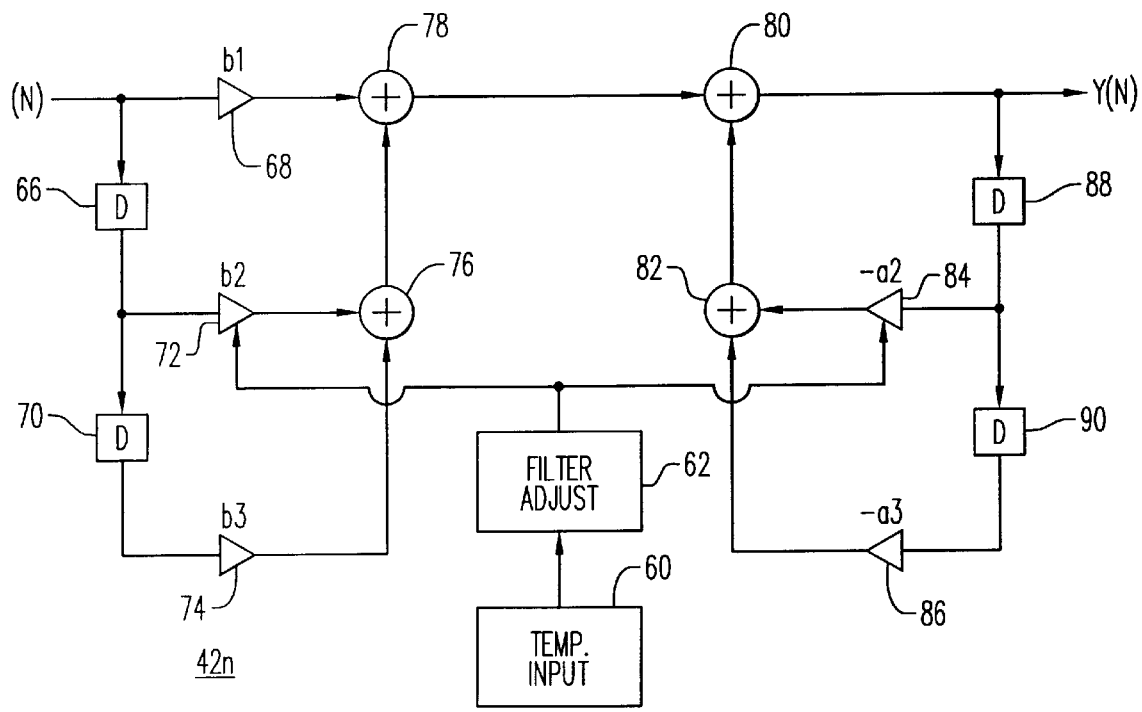
FIG. 3 illustrates in greater detail filtering circuit of FIG. 2.

FIG. 3, to which attention is now directed, is a block diagram for a two pole notch filter 42n. Broadband input signal X(n) is coupled to a delay (D) 66 and to a multiplier 68 of value b1. The output of delay 66 is coupled to delay 70 (All delays in FIG. 3 are identical) and to a second multiplier 72 of value b2. The output of delay 70 is coupled to a third multiplier 74 of value b3. The output of multiplier 74 and the output of multiplier 72 are coupled to respective inputs of summer 76. The output of multiplier 68 and the output of summer 76 are coupled to respective inputs of summer 78.

The output of summer 78 is coupled to one input of summer 80. Another summer 82 is coupled to the second input of summer 80. Multiplier 84 of value −a2 and multiplier 86 of value −a3 are coupled to respective inputs of summer 82. The output of summer 80 is coupled to notch filter output Y(n) and to a delay 88. The output of delay 88 is coupled to the input of multiplier 84 and to another delay 90, the output of which is coupled to the input of multiplier 86.

It will be noted that the left and right sections of filter 42n are mirror images of one another except that the equivalent of multiplier 68 is missing. The reason will be explained shortly.

It will be appreciated that timing circuits are needed for the operation of notch filter 42n but such are not shown to simplify the explanation. Thus under control of such timing circuits, digital signals are applied at successive times to X(n) where the time between successive signals is, by way of example, 50 to 100 microseconds.

The temperature input 60 is coupled to filter adjust circuit 62, the output of which is coupled as an additional input to multipliers 72 and 84. Table 1 shows the relationship between various temperatures and resonance frequencies and the value of the various multipliers.

TABLE 1

| Temp. (Deg. C.) | Freq. | b1 | b2 | b3 | a1 | a2 | a3 |
|---|---|---|---|---|---|---|---|
| 9 | 4300 | .923 | 1.34 | .923 | 1.00 | 1.34 | .846 |
| 25 | 4500 | .923 | 1.47 | .923 | 1.00 | 1.47 | .846 |
| 41 | 4700 | .923 | 1.59 | .923 | 1.00 | 1.59 | .846 |
| 57 | 4900 | .923 | 1.68 | .923 | 1.00 | 1.68 | .846 |
| 71 | 5100 | .923 | 1.76 | .923 | 1.00 | 1.76 | .846 |

The first column represents the temperature of the servo system mechanical components including (in FIG. 1) drive motor 14, arm 16 and read/write head 18. The second column (Freq.) represents the corresponding center frequency of a 300 Hz wide Butterworth notch and the remaining six columns are the six coefficients shown in FIG. 3.

It will be noted from a review of Table 1 that coefficients −a1 are all 1 no matter what the temperature (That is why no multiplier equivalent to 68 between the output of summer 80 and the output Y(n) is needed) and that only coefficients b2 and a2 change with temperature and thus frequency. It will be further noted that for any given temperature or frequency, b2 and a2 are identical in value. Other classes and orders of filters exhibit similar redundancy.

It has been determined empirically that the relationship between resonance frequency and temperature is 12.5 Hertz per degree C. It has been further determined empirically that at 25° C., the resonant frequency is 4500 Hz.

Alternatively b2 and a2 can be calculated as a function of desired a frequency. For example, if f is the desired center frequency, then $b2=a2=2.4239e{-}007*f^2+2.8028e{-}003*f{-}6.2309$ (approximately)

Thus filter adjust 62 either implements Table 1 or the above formula. The result is that broadband signal X(n) is attenuated at the frequency correlated to the temperature signal from temperature input device 60.

Notch filter 42n can be analog or digital and if digital, can be implemented in hardware or software. In a preferred embodiment, a digital filter implemented in software is contemplated.

Figure 4:
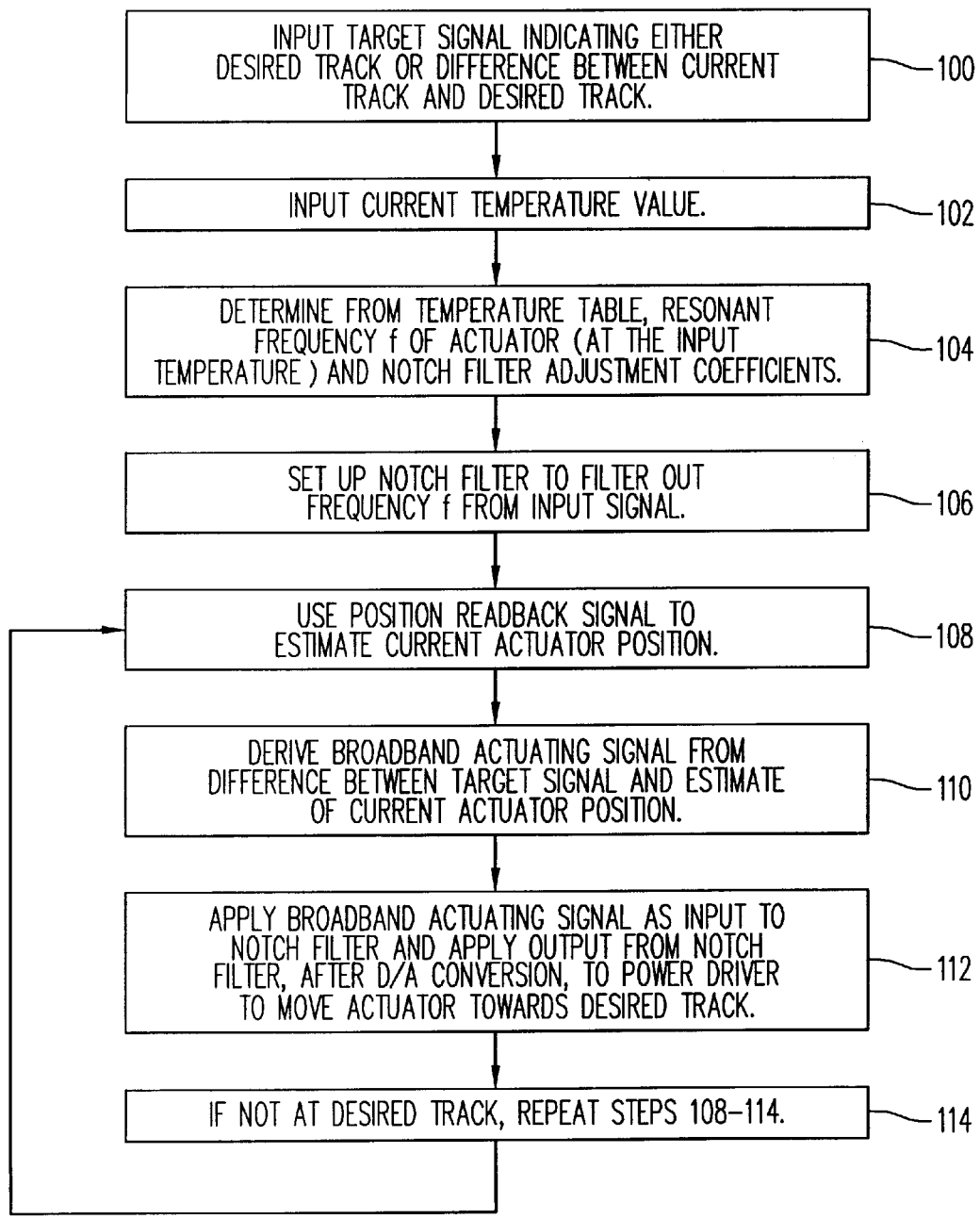
FIG. 4 is a logic flow diagram illustrating the method of the invention.

Turning now to the flow diagram of FIG. 4, the method of the invention will be further described. Initially, an input target signal is applied to position controller 30, the target signal indicating either a desired track or difference between a current track and the desired track (step 100). In addition, a current temperature value is also input (step 102).

Based upon the input temperature value, position controller 30 determines from the temperature table, the resonant frequency f of actuator 16 and notch filter function adjustment coefficients that are required to eliminate frequency f from a broadband input signal (step 104). Notch filter is then set up, using the accessed coefficients (step 106) Steps 100–106 are performed only once, at the start of the track seek operation.

An estimator function is now executed by position controller 30, using the above described position readback signal to estimate a current actuator position (step 108). Position controller 30 then derives the broadband actuating signal, based upon the difference between the target signal and the estimate of current actuator position (step 110). The broadband actuating signal is then input to notch filter function 42 that eliminates frequency f therefrom (step 112). The output from notch filter function 42, after D/A conversion, is fed to driver 48 that outputs an amplified broadband signal, less frequency f, to move actuator 16 towards the desired track. The process reiterates to step 108 until the actuator is properly positioned over the desired track (step 114).

It should be understood that the foregoing description is only illustrative of the invention. Various alternatives and modifications can be devised by those skilled in the art without departing from the invention. For example, while the invention has been described based on the assumption that all of the controlling software is already loaded into position controller 30, the software can also be loaded on an as-needed basis from a memory device, such as memory disk 31 in FIG. 1. Accordingly, the present invention is intended to embrace all such alternatives, modifications and variances which fall within the scope of the appended claims.

What is claimed is:

1. A servo system for operating in a region of ambient temperature, said system comprising:
    a first member;
    a second member positionable relative to said first member;
    a control loop comprising circuitry for producing a broadband frequency signal coupled to said second member, for further causing said second member to be positioned to a desired location relative to said first member;
    said second member having a natural resonant frequency f, which is a function of said ambient temperature and varies between f1 and f2 with temperature, where f1<f2;
    said servo system including means for measuring said ambient temperature and providing an output signal indicative thereof; and
    said control loop including means responsive to said output signal for attenuating in said broadband frequency signal only a narrow band of frequencies that lie within said frequency range f1–f2, said narrow band including said frequency f.

2. The system as set forth in claim 1 wherein said control loop includes a notch filter set to attenuate said broadband signal at said resonant frequency f of said transducer structure and is coupled to receive said temperature signal for setting the attenuation frequency as a function of said temperature.

3. The system as set forth in claim 2 wherein said notch filter is a digital filter.

4. The system as set forth in claim 3 wherein said notch filter has a plurality n of filter coefficients and wherein the notch frequency f is changed as a function of temperature by altering m (where m<n) of said coefficients.

5. The system as set forth in claim 4 wherein said m coefficients are stored in a table as a function of various temperatures.

6. The system as set forth in claim 5 wherein a one of m coefficients, corresponding to the measured temperature, is applied to said notch filter to cause it to be set to frequency f.

7. A disk servo system, comprising:
    a disk for storing information content in tracks;
    a transducer structure positionable over any one of said tracks for reading said information content therefrom, said transducer structure having a natural frequency f which varies as a function of temperature of said transducer structure within a range between f1 and f2;
    a sensor producing a signal representing the temperature of said transducer structure; and
    a control loop comprising circuitry coupled to said transducer structure for producing a broadband signal, and responsive to said temperature signal for maintaining said transducer structure positioned relative to said one track by attenuating in said broadband frequency signal only a narrow band of frequencies that lie within said frequency range f1–f2, where f1<f2, said narrow band including said frequency f.

8. The system as set forth in claim 7 wherein said control loop includes a notch filter set to attenuate said broadband signal in said narrow band including said resonant frequency f of said transducer structure and is coupled to receive said temperature signal for setting the attenuation frequency as a function of said temperature.

9. The system as set forth in claim 8 wherein said notch filter is a digital filter.

10. The system as set forth in claim 9 wherein said notch filter has a plurality n of filter coefficients and wherein the notch frequency f is changed as a function of temperature by altering m (where m<n) of said coefficients.

11. The system as set forth in claim 10 wherein said m coefficients are stored in a table as a function of various temperatures.

12. The system as set forth in claim 10 wherein said m coefficients are calculated as a function of various temperatures.

13. The system as set forth in claim 10 wherein a one of m coefficients, corresponding to the measured temperature, is applied to said notch filter to cause it to be set to frequency f.

14. A method for operating a servo system in a region of ambient temperature, said system including a first member, a second member that is positionable relative to said first member, a control loop comprising circuitry for producing a broadband frequency signal coupled to said second member that causes said second member to be positioned to a desired location relative to said first member, said second member having a natural resonant frequency f that varies with temperature within a frequency range between f1 and f2, said method comprising the steps of:

measuring said ambient temperature and providing an output signal indicative thereof; and responding to said output signal by attenuating in said broadband signal only a narrow band of frequencies that lie within said frequency range f1–f2, where f1<f2, said narrow band including said frequency f.

15. A method for controlling a disk servo system, said system including a disk for storing information content in tracks, a transducer structure positionable over any one of said tracks for reading said information content therefrom, said transducer structure having a natural frequency f which varies as a function of temperature of said transducer structure within a range between f1 and f2, a temperature sensor producing a signal representing the temperature of said transducer structure, and a control loop comprising circuitry coupled to said transducer structure for producing a broadband signal for application to said transducer structure to control movement thereof, said method comprising the steps of:

a) determining through use of said temperature signal a value of said natural frequency for said transducer structure; and b) attenuating in said broadband frequency signal only a narrow band of frequencies that lie within said frequency range f1–f2, where f1<f2, said narrow band including said frequency f.

16. The system as set forth in claim 15 wherein said control loop includes a notch filter and step b) controls said notch filter to attenuate said broadband signal in said narrow band including said resonant frequency f as a function of said temperature signal provided by step a).

17. The method as set forth in claim 15 wherein said notch filter is a digital filter and has a plurality n of filter coefficients and wherein step b) adjusts the notch filter as a function of temperature by altering m (where m<n) of said coefficients.

18. A memory media for operating a controller of a servo system in a region of ambient temperature, said system including a first member, a second member that is positionable relative to said first member, a control loop comprising circuitry for producing a broadband frequency signal coupled to said second member that causes said second member to be positioned to a desired location relative to said first member, said second member having a natural resonant frequency f that varies with temperature within a frequency range between f1 and f2, said memory media comprising:

means for operating said controller to detect an ambient temperature signal; and means for operating said controller to respond to said ambient temperature signal by setting a filter to attenuate in said broadband signal only a narrow band of frequencies that lie within said frequency range f1–f2, where f1<f2 said narrow band including said frequency f.

19. A memory media operating a controller of a disk servo system, said system including a disk for storing information content in tracks, a transducer structure positionable over any one of said tracks for reading said information content therefrom, said transducer structure having a natural frequency f which varies as a function of temperature of said transducer structure within a range between f1 and f2, a temperature sensor producing a signal representing the temperature of said transducer structure, and a control loop comprising circuitry coupled to said transducer structure for producing a broadband signal for application to said transducer structure to control movement thereof, said memory media comprising:

a) means for operating said controller to determine through use of said temperature signal a value of said natural frequency for said transducer structure; and b) means for operating said controller to attenuate in said broadband frequency signal only a narrow band of frequencies that lie within said frequency range f1–f2, where f1<f2, said narrow band including said frequency f.

20. The memory media as set forth in claim 19 wherein said control loop includes a notch filter and means b) operates said controller to adjust said notch filter to attenuate said broadband signal in said narrow band including said resonant frequency f as a function of said temperature signal.

21. The memory media as set forth in claim 19 wherein said notch filter is a digital filter and has a plurality n of filter coefficients and wherein means b) operates said controller to adjust the notch filter as a function of temperature by altering m (where m<n) of said coefficients.

* * * * *